United States Patent
Liu et al.

(10) Patent No.: US 8,993,200 B2
(45) Date of Patent: Mar. 31, 2015

(54) OPTIMIZATION OF BZCYYB SYNTHESIS

(75) Inventors: MingFei Liu, Atlanta, GA (US); Meilin Liu, Alpharetta, GA (US); Ting He, Bartlesville, OK (US); Lei Yang, Atlanta, GA (US)

(73) Assignees: Georgia Tech Research Corporation, Atlanta, GA (US); Phillips 66 Company, Houston, TX (US)

( * ) Notice: Subject to any disclaimer, the term of this patent is extended or adjusted under 35 U.S.C. 154(b) by 287 days.

(21) Appl. No.: 13/610,126

(22) Filed: Sep. 11, 2012

(65) Prior Publication Data

US 2013/0196247 A1 Aug. 1, 2013

Related U.S. Application Data

(60) Provisional application No. 61/540,320, filed on Sep. 28, 2011.

(51) Int. Cl.
*H01M 4/88* (2006.01)
*H01M 4/90* (2006.01)
*H01M 8/00* (2006.01)
*H01M 8/10* (2006.01)
*H01M 8/12* (2006.01)
*H01M 10/0562* (2010.01)

(52) U.S. Cl.
CPC ........ *H01M 8/1016* (2013.01); *H01M 10/0562* (2013.01); *Y02E 60/521* (2013.01)
USPC ............ 429/535; 429/482; 429/489; 429/496

(58) Field of Classification Search
USPC .................................. 429/482, 489, 496, 535
See application file for complete search history.

(56) References Cited

U.S. PATENT DOCUMENTS

| | | | |
|---|---|---|---|
| 4,610,967 A | * | 9/1986 | Imanishi et al. ............... 501/103 |
| 5,356,728 A | | 10/1994 | Balachandran et al. |
| 7,595,127 B2 | | 9/2009 | Seabaugh et al. |
| 2010/0112408 A1 | | 5/2010 | Yang et al. |
| 2010/0123370 A1 | | 5/2010 | Yamaguchi et al. |
| 2011/0195342 A1 | | 8/2011 | Luo et al. |
| 2011/0210281 A1 | | 9/2011 | Kaigawa et al. |

FOREIGN PATENT DOCUMENTS

WO    WO-2011100361 A2    8/2011

OTHER PUBLICATIONS

Yang et al., Enhanced Sulfur and Coking Tolerance of a Mixed Ion Conductor for SOFCs: BaZr0.1Ce0.7Y0.2-xYbx03-d, Oct. 2009, Science, 326, 126-129.*

International Search Report issued Jan. 7, 2013 for PCT/US2012/054609.

(Continued)

*Primary Examiner* — Sean P Cullen
(74) *Attorney, Agent, or Firm* — Gardere Wynne Sewell LLP; Chris P. Perque; Teresa J. Lechner-Fish

(57) ABSTRACT

The present invention relates to a novel method for preparing a BZCYYb material to be used in a solid oxide fuel cell. In particular, the method comprises mixing particular nano-sized and micro-sized ingredients and the size selection provides greatly improved performance characteristics of the resulting material. In particular, barium carbonate powder, zirconium oxide powder having particle diameters in the nanometer range, and cerium oxide powder having particle diameter in the micrometer range are used together with ytterbium oxide powder, and yttrium oxide powder.

9 Claims, 5 Drawing Sheets

(56) References Cited

OTHER PUBLICATIONS

PCT Jan. 7, 2013 International Search Report and Written Opinion entered for PCT International Application PCT/US2012/054609 filed Sep. 11, 2012.

Atkinson et al., *Advanced anodes for high-temperature fuel cells*, Nature Materials 3 (Jan. 2004) 17-27.

Chen, et al., *Cool-down time of solid oxide fuel cells intended for transportation application*, Journal of Power Sources 58(1) (1996) 87-91.

Fleig, *Solid oxide fuel cell cathodes: Polarization mechanisms and modeling of the electrochemical performance*, Ann. Rev. Mater. Res. 33 (2003) 361-382.

Goodenough, *Oxide-ion electrolytes*, Ann. Rev. Mater. Res. 33 (2003) 91-128.

Kniep, et al., *Effect of zirconium doping on hydrogen permeation through strontium cerate membranes*, Ind. Eng. Chem. Res. 49(6) (2010) 2768-2774.

Lewis, et al., *Powering the planet: Chemical challenges in solar energy utilization*, Proc. Natl. Acad. Sci. U.S.A. 103(43) (Oct. 24, 2006) 15729-15735, Erratum in: Proc. Natl. Acad. Sci. U.S.A. 104(50) (Dec. 11, 2007) 20142-20143.

Singhal, *Advances in solid oxide fuel cell technology*, Solid State Ionics 135 (2000) 305-313.

\* cited by examiner

OPTIMIZATION OF BZCYYB SYNTHESIS

PRIORITY CLAIM

This application claims priority to 61/540,320, filed Sep. 28, 2011, and expressly incorporated by reference herein in its entirety.

FIELD OF THE INVENTION

The invention relates to a method for preparing electrolyte and electrode materials to be used in Solid Oxide Fuel Cells (SOFCs), and particularly to a method for optimizing the preparation of materials to be used in SOFCs that have both high purity and electrical conductivity.

BACKGROUND OF THE INVENTION

The demand for clean, secure, and renewable energy has stimulated great interest in fuel cells. Fuel cells are one distinct category of devices that are capable of converting chemical energy into electrical energy. Among the fuel cells that are currently under active development, the alkaline fuel cell, the polymeric-electrolyte-membrane fuel cell and the phosphoric-acid fuel cell all require essentially pure hydrogen as the fuel to be fed to the anode.

Solid Oxide Fuel Cells (SOFCs), on the other hand, are a type of fuel cells that use a solid, mostly ceramic and inorganic oxides, as the electrolyte of a cell. The solids typically are not conductive until they reach high temperature, but the high temperatures also allow reforming of low molecular weight hydrocarbons, therefore the fuel processing reaction can be carried out within the cell stacks without additional fuel processors. SOFCs thus offer great promise for the efficient and cost-effective utilization of a wide variety of fuels such as ethanol and methane, coal gas and gasified biomass.

The major hurdle to fuel flexibility is the vulnerability of the state-of-the-art Ni-YSZ (yttria-stabilized-zirconia) anode materials to coking and sulfur poisoning. In addition, the high operating temperatures of SOFCs, stemming from the low ionic conductivity of the electrolyte materials and the poor performance of the cathode materials at lower temperatures, increase costs and reduce the system operation life.

Thus, in order to make SOFCs fully fuel-flexible and cost-effective power systems, the issues of anode tolerance to coking and sulfur poisoning, slow ionic conduction in the electrolyte and sluggish kinetics at the cathode need to be addressed. In a broader scientific context, the chemical and electrochemical mechanisms that lead to both of these issues and the phenomena that could prevent them should be investigated in order to best optimize the materials and microstructure of SOFCs for excellent performance and stability.

Oxygen ion conductors have been the conventional conductors for electrolyte use in SOFC (see e.g. the reactions shown in Table 1). The prevailing material for an oxygen ion type solid electrolyte is yttria-stabilized zirconia (YSZ). Consequently, the high operating temperature of SOFCs is necessary because the ion conductivity is only satisfactory when the operating temperature is, for example, higher than 750° C.

However, today both proton and mixed ion conductors are also available for SOFC use. Proton-conducting electrolytes have the advantages of high proton conductivity and low activation energy at intermediate temperatures, which may widen the selection of materials to be used in SOFC. Additional advantages of proton-conducting electrolytes include water being generated in the cathode side of the SOFC, thus avoiding fuel dilution at the anode side. The reaction chemistry and examples of oxygen-ion conductors and proton conductors are shown in Table 1:

TABLE 1

Oxygen ion and proton conductors

| Type of conductor | Oxygen ion | Proton |
|---|---|---|
| Anode | $H_2 + O^{2-} \rightarrow H_2O + 2e^-$/ $CO + O^{2-} \rightarrow CO2 + 2e^-$ | $H_2 \rightarrow 2H^+ + 2e^-$ |
| Cathode | $O_2 + 4e^- \rightarrow 2O^{2-}$ | $2H^+ + 2e^- + \frac{1}{2} O_2 \rightarrow H_2O$ |
| Overall | $2H_2 + O_2 \rightarrow 2H_2O$/ $2CO + O_2 \rightarrow 2CO_2$ | $2H_2 + O_2 \rightarrow 2H_2O$ |
| Advantages | $H_2O$, $CO_2$ and high temperatures at anode (fuel side) facilitates reforming of hydrocarbon fuels to $H_2$ and CO | No fuel dilution Intermediate operating temperature |
| Disadvantages | High operating temperature degrades system components and adds to cost $H_2O$ formed at anode dilutes fuel | Reforming at anode (fuel side) lost |
| Examples | Yttria-stabilized zirconia (YSZ) Samarium doped ceria (SDC) Gadolinium doped ceria (GDC) Scandia stabilized zirconia (ScSZ) Strontium and magnesium doped lanthanum gallate (LSGM) | Y-doped $BaZrO_3$ (BYZ) Calcium-doped lanthanum niobate (LCaNb) Y-doped $BaCeO_3$ (BCY) Barium-zirconium-cerium-yttrium (BZCY) Yttrium- and ytterbium-doped barium-zirconate-cerate (BZCYYb) Scandia doped BZCY (BZCYSc) |

The third option is to tailor the proton and oxygen ion transference number of the mixed ion conductor, allowing $CO_2$ to form on the fuel side while allowing most of the $H_2O$ to form on the air side. The class of mixed proton and oxygen ion conductors holds great potential for a new generation of low temperature SOFCs. However, to date the ideal mixed ionic conductor has not been found.

The above-mentioned electrolytes generally have a perovskite structure with chemical formula $ABX_3$, wherein the A and B atoms are cations with different sizes and X is an anion bonding to each cation. Usually the A atom is larger than the B atom, and the relative ion size is crucial to the stability of the resulting structure. To alter the physical and chemical properties of a perovskite substance, doping at either A or B site of the structure has been attempted.

Recent developments in solid electrolytes, especially in the area of increasing the ion conductivity at lower temperature, include reducing the thickness of the solid electrolyte so that the distance between the cathode and anode is shorter for the oxygen ions to travel. However, the thinner materials are more likely to break.

Other improvement includes changes of composition or doping with additional materials to increase the ion conductivity at lower temperatures.

For example, doped ceria is one of the most promising electrolyte materials that has the potential of sufficient ion conductivity at temperatures lower than 650° C. However, other issues of this material need to be addressed before it can be commercially employed, such as electric conduction and poor mechanical integrity.

Based on the fact that doped barium cerate exhibits a high ionic conductivity but poor chemical stability, while doped barium zirconate based materials have superior chemical and thermal stability but low conductivity, it has been proposed to replace a fraction of Ce in $BaCeO_3$ with Zr. This type of solid solution is expected to exhibit high proton conductivity and excellent chemical and mechanical stability, as well as high ionic transference number over a wide range of conditions.

Yttrium- and ytterbium-doped barium-zirconate-cerate or "BZCYYb" is a mixed protonic and oxygen ionic conducting electrolyte that has demonstrated good conductivity. However, under most conditions, the proton conductivity is far greater than the oxygen ion conductivity. Furthermore, the material tolerates hydrogen sulfide in concentrations as high as 50 parts-per-million, does not accumulate carbon and can operate efficiently at temperatures as low as 500° C.

US20100112408 discloses the preparation of $BaZr_{0.1}Ce_{0.7}Y_{0.2-x}Yb_xO_{3-\delta}$, by mixing all the ingredients followed by calcination. This preparation method, however, is not optimized to give the best performance of BZCYYb, and thus, there is considerable room for improvement.

Thus, what is needed in the art are better materials for use in SOFCs, which have both excellent ion conductivity at lower operating temperatures, but still maintain chemical and mechanical stability under the conditions of use.

SUMMARY OF THE INVENTION

It is well known that the electrical conductivity of barium cerate based materials exquisitely depends on the fabrication methods. The objective of our effort was to eliminate the impurity phases to further enhance the conductivity of the BZCYYb electrolyte materials.

Thus, the present invention provides a method for preparing BZCYYb electrolyte material that has higher conductivity than the same material prepared by conventional methods. Unlike the prior art methodologies, which do not select the particle size of ingredients, the method used herein requires selecting the particle size of the ingredients, and by such selection the resulting electrolyte shows surprisingly higher ionic conductivity and power density than those prepared by conventional methods.

Inventors of the present invention have proposed that $BaZr_{1-x-y-z}Ce_xY_yYb_zO_{3-\delta}$ (where x, y z are dopant levels and $0<x+y+z<1$, and delta is the oxygen ion deficit) (herein called "BZCYYb") can have excellent ion conductivity at temperature lower than 750° C., while maintaining chemical and mechanical stability under operating conditions of SOFCs. In fact, the Yb and Y co-doped BZC conductor demonstrated the highest electrical conductivity below 750° C. ever reported among the electrolyte materials in SOFCs.

The mole ratios of dopants x, y, z can vary from >0 to <1, but preferably x and z are 0.01-0.5 with y making the remainder if no other dopants are present. One preferred BZCYYb is $BaZr_{0.1}Ce_{0.7}Y_{0.1}Yb_{0.1}O_{3-\delta}$. Preferably, the Zr is kept low (e.g., about 0.1) to avoid loss of conductivity, while still stabilizing the material.

Therefore, the present invention provides a novel method for preparing a BZCYYb electrolyte material to be used in a SOFC. The method can also be used to prepare anode and cathode materials to be used in a SOFC by adding additional material to the specially prepared BZCYYb material, such as NiO (anode) or LSCF (cathode).

In more detail, the present invention provides a method of preparing a single-phase pure BZCYYb electrolyte material by first providing the following ingredients: i) barium carbonate powder and zirconium oxide powder having particle diameters in the nanometer range, ii) cerium oxide powder having particle diameter in the micrometer range, and iii) ytterbium oxide powder, and yttrium oxide powder having particle diameter in the nanometer range. The mixture is ball-milled and then calcined to a high temperature, preferably higher than 1000° C. If necessary, the calcined mixture can be ball-milled again, and calcined again.

In the present method, it is crucial to have zirconium oxide powder having particle diameters in the nanometer range and the cerium oxide powder having particle diameter in the micrometer range, because this optimizes the doping reaction of all the ingredients such that the resulting product has a pure single-phase perovskite structure. In a preferred embodiment, the zirconium oxide powder has particle diameters between 50 and 200 nanometers. In another preferred embodiment, the cerium oxide powder has particle diameters between 1 and 10 micrometers.

Any means known in the art can be used to prepare nano- and micro-sized powders for use, and common methods include some type of grinding optionally followed by size sifting. E.g., Gateshki M. & Petkov V., Atomic-scale structure of nanocrystalline $ZrO_2$ prepared by high-energy ball milling Physical Review B 71, 224107 (2005).

However, it is also know in the art how to synthesize nano-sized crystals. E.g., Chang Y. et al., Synthesis of monodisperse spherical nanometer ZrO2 (Y2O3) powders via the coupling route of w/o emulsion with urea homogeneous precipitation, Materials Research Bulletin 47(3): 527-531 (2012); Wang J. et al., Synthesis and Characterization of Core-shell ZrO2/PAAEM/PS Nanoparticles, Nanoscale Res Lett. 4(3): 240-246 (2009); Xu X. & Wang X., Fine Tuning of the Sizes and Phases of ZrO2 Nanocrystals, Nanoscale Research Letters Nano Res 4(3): 240-246 (2009), and the like.

The present invention further provides a BZCYYb prepared by the method described above, and a solid electrolyte comprising same. Additionally, the present invention also provides a solid oxide fuel cell comprising a BZCYYb electrolyte that is prepared by the method described above.

The cathode and anode materials can be any known in the art that are compatible with BZCYYb electrolytes. Some exemplary SOFC anode/electrolyte/cathode materials include Ni-BZCYYb|BZCYYb|PBCO, NiO-BZCYYb/BZCYYb/LSCF-BZCYYb cathode; Ni-BZCYYb/Ni-BZCYYb/BZCYYb/SFSb (quad layer SOFC); BZCYYb/BZCYYb/PBC-BCPY.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The following abbreviations are used herein:

| | |
|---|---|
| BCPY | Yttrium- and praseodymiume-doped barium-cerate e.g., $Ba(Ce_{0.4}Pr_{0.4}Y_{0.2})O_{3-\delta}$ |
| BCY | Y-doped $BaCeO_3$ |
| BYZ | Y-doped $BaZrO_3$ |
| BZCY | Yttrium doped barium-zirconate-cerate BaZrCeY e.g., $BaZr_{0.1}Ce_{0.7}Y_{0.2}O_{3-\delta}$ |
| BZCYSc | Scandia doped BZCY |
| BZCYYb | Yttrium- and Ytterbium-doped Barium-Zirconium-Cerate, e.g., $BaZr_{1-x-y-z}Ce_xY_yYb_zO_{3-\delta}$, e.g., $BaZr_{0.1}Ce_{0.7}Y_{0.1}Yb_{0.1}O_{3-\delta}$ |
| GDC | Gadolinium doped ceria |
| LCaNb | Calcium doped lanthanum niobate |
| LSCF | Lanthanum strontium cobalt ferrite, e.g., $La_{1-x}Sr_xCo_{1-y}Fe_yO_{3-\delta}$ e.g., $La_{0.6}Sr_{0.4}Co_{0.2}Fe_{0.8}O_{3-\delta}$ |
| LSGM | Strontium and magnesium doped lanthanum gallate |
| LSM | Strontium-doped lanthanum manganite e.g., Sr—$LaMnO_3$, $La_{1-x}Sr_xMnO_{3-\delta}$ e.g., $La_{0.83}Sr_{0.15}MnO_{3-\delta}$ |
| nm | nanometer |
| OCV | Open circuit voltage |
| PBC | Praseodymium-doped Barium Cobalt Oxide e.g., $PrBaCo_2O_{5+\delta}$ |
| PBCO | See PBC |
| PBFO | Praseodymium-doped Barium Ferrites e.g., $PrBaFe_2O_{5+\delta}$ |
| Sccm | Standard Cubic Centimeters per Minute |
| ScSZ | Scandia-stabilized zirconia |
| SDC | Samarium doped ceria |
| SFSb | Antimony-doped strontium iron oxide, e.g., $SrFe_xSb_yO_{3-\delta}$ e.g., $SrFe_{0.9}Sb_{0.1}O_{3-\delta}$ |
| SOFC | Solid Oxide Fuel Cells |
| SSC | Strontium-doped samarium cobaltite e.g., $Sm_{0.5}Sr_{0.5}CoO_{3-\delta}$ |
| YSZ | Yttria-stabilized zirconia |
| μm | micrometer |

Where x, y z are dopant levels and $0 < x + y + z < 1$, and delta is the oxygen ion deficit As used herein "nanometer range" is defined as between 1 and 1000 nanometers, preferably 10-500 nm, most preferred 50-200 nm. As used herein, nano-sized refers to an amount falling within the above defined range for nanometer. As used herein, "micrometer range" is defined between 1 and 1000 micrometers, preferably between 1-100 microns, most preferred between 1-20 microns. As used herein, micro-sized refers to an amount falling within the above defined range for micrometer.

When a size is referred to, what is meant is the average particle size, with a range of sizes of =/−10%, preferably +/−5%.

DESCRIPTION OF EMBODIMENTS OF THE INVENTION

Figure 1:
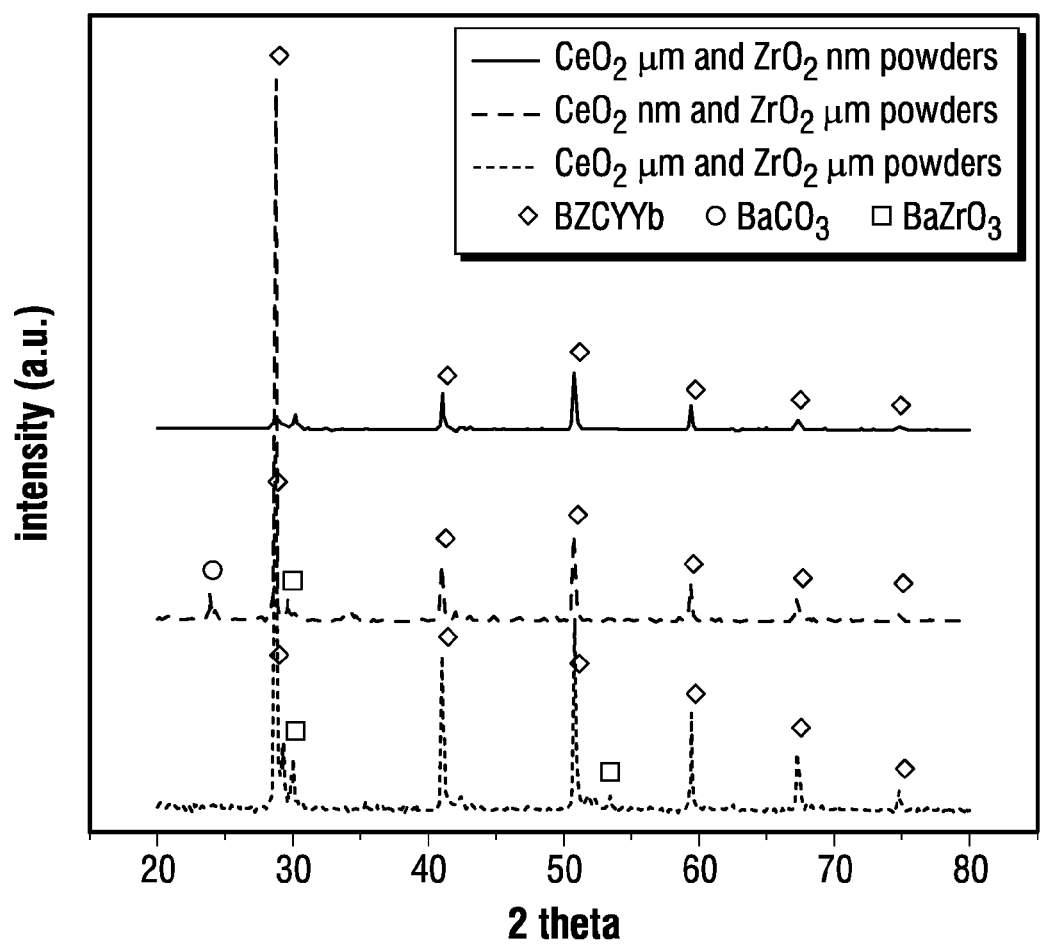
FIG. 1 shows XRD patterns comparing the BZCYYb powders fabricated from $CeO_2$ and $ZrO_2$ powders of different ranges of diameter.

An improved method of making a BZCYYb is provided by mixing and calcining the ingredients thereof, wherein said improvement comprises using nano-sized zirconium oxide powder and micrometer sized cerium oxide powder as starting ingredients. The BZCYYb made by the method is another aspect of the invention, as are anodes, cathodes and electrolytes comprising the single phase BZCYYb of the invention, and SOFC comprising one or more of same.

In another embodiment, the present invention provides a novel combination of cerate and zirconium oxide particles of diameters in the micrometer and nanometer ranges, respectively, used to make BZCYYb containing materials.

Preferably, the nanometer sized zirconium oxide powder is <500, preferably or 50-200 nm, most preferred about 5-10 nm. The diameter of the micrometer sized cerium oxide powder is preferably between 1-100 μm, most preferred about 1-20 μm or 5-10 μm.

In the present method, the calcining step is carried out at preferably higher than 1000° C. in air for 10 hours. However, the temperature and the length of calcination can vary, depending on different factors to be considered, such as the particle size chosen.

In more detail, the invention is a method for preparing a homologous or single phase BZCYYb, comprising the steps of obtaining the following ingredients in stoichiometric amounts: i) barium carbonate powder and zirconium oxide powder having average particle diameters in the nanometer range, ii) cerium oxide powder having average particle diameter in the micrometer range, and iii) ytterbium oxide powder and yttrium oxide powder. The ingredients are then mixed, preferably with an evaporatable solvent such as EtOH or MeOH and preferably vigorously mixed e.g., by grinding or ball milling or otherwise. The mixture is then calcined for a suitable time. The calcined material can be re-ground and re-calcined if desired. The resulting single phase BZCYYb can be used as an electrolyte, or as an electrode, e.g., by adding NiO or LSCF thereto.

The resulting BZCYYb has an ionic conductivity of about 0.03 S·cm$^{-1}$ at about 600° C. and about 0.09 S·cm$^{-1}$ at about 800° C.

The following discussions are illustrative only, and are not intended to unduly limit the scope of the invention.

Preparation of BZCYYb

The $CeO_2$ and $ZrO_2$ powders with different particle sizes were used to optimize the fabrication procedures. The size ranges that were tested are given in Table 2:

TABLE 2

Starting materials for material synthesis

| Sample | BaCO$_3$ | ZrO$_2$ | CeO$_2$ | Y$_2$O$_3$ | Yb$_2$O$_3$ |
|---|---|---|---|---|---|
| Sample A | ~200 nm | 50-100 nm | ~5 um | 100-200 nm | 100-200 nm |
| Sample B | ~200 nm | 1-2 um | ~10 nm | 100-200 nm | 100-200 nm |
| Sample C | ~200 nm | 1-2 um | ~5 um | 100-200 nm | 100-200 nm |

To make the test materials, stoichiometric molar amounts of high-purity barium carbonate, zirconium oxide, cerium oxide, ytterbium oxide, and yttrium oxide powders (all from SIGMA ALDRICH CHEMICALS™) were mixed by ball milling in ethanol for 48 h, followed by drying in an oven and calcination at 1100° C. in air for 10 h. The calcined powder was ball milled again, followed by another calcination at 1100° C. in air for 10 h.

To prepare electrolyte samples for the conductivity measurement, we pressed the calcined powders isostatically into a disk at 274.6 MPa. The green disks had a diameter of 10 mm, with a typical thickness of 1 mm. The disks were then sintered at 1500° C. for 5 h in air (relative density >96%).

Platinum paste was then applied to both sides of electrolyte disks and fired at 900° C. for 30 min to form porous platinum electrodes. Two platinum wires were attached to each of the electrodes. The electrical conductivities were studied in dry and wet oxygen, H$_2$, argon, and 4% H$_2$ (balanced with argon) at different temperatures. The wet gases were prepared by passing the corresponding gases though a water bubbler at 25° C. to bring in ~3 v % of water vapor.

Comparing Purity

FIG. 1 shows some typical XRD patterns of BaZr$_{0.1}$Ce$_{0.7}$Y$_{0.1}$Yb$_{0.1}$O$_3$ powders fabricated from CeO$_2$ and ZrO$_2$ powders of different particle sizes. The use of powder (a) with nano-sized ZrO$_2$ and micro-sized CeO$_2$ produced a pure perovskite phase without impurity peaks, while that of powders (b) and (c) resulted in second phase(s) of impurities such as BaCO$_3$ (○) and BaZrO$_3$ (□), as indicted by the shoulders and additional small peaks between the major peaks. Analysis suggests that the samples derived from powder (b) with nano-sized CeO$_2$ and micro-sized ZrO$_2$ have secondary phases of BaCO$_3$ and BaZrO$_3$. The samples derived from powder (c) with CeO$_2$/μm and ZrO$_2$/μm contain secondary phase BaZrO$_3$ but not BaCO$_3$.

In contrast, the pure single phase samples derived from powder (a) is probably due to a complete reaction of raw materials. Since the weight of CeO$_2$ is approximately 10 times that of ZrO$_2$, the intimate contact between the two precursors would be the highest for CeO$_2$/μm and ZrO$_2$/nm. On the other hand, the volume of ZrO$_2$/μm is too small in the raw materials of powder (c) to disperse uniformly, and the particle size distributions are inadequate when fabricated by CeO$_2$/μm and ZrO$_2$/μm.

Figure 2:
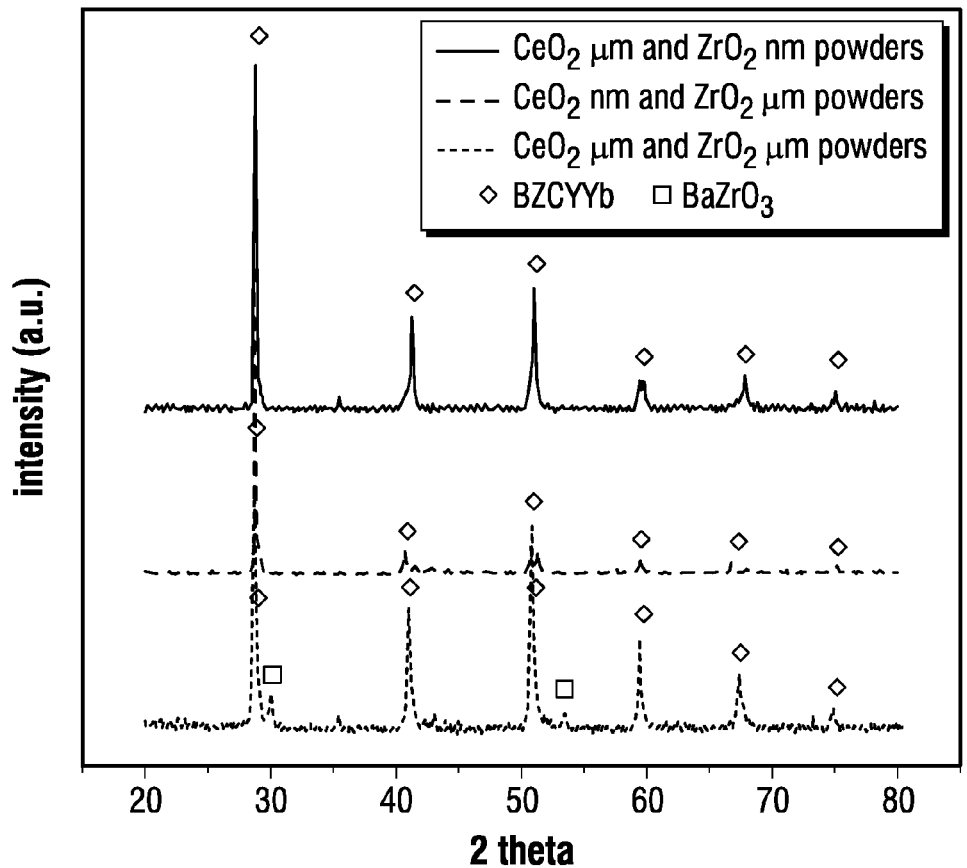
FIG. 2 shows XRD patterns of BZCYYb pellets fabricated from $CeO_2$ and $ZrO_2$ powders of different ranges of diameter.

FIG. 2 shows XRD patterns of BaZr$_{0.1}$Ce$_{0.7}$Y$_{0.1}$Yb$_{0.1}$O$_3$ pellets fabricated from CeO$_2$ and ZrO$_2$ precursors with different particle sizes. Clearly, sample (a) has a pure perovskite phase after sintering at 1500° C. for 5 hours, as indicated by the lack of extra peaks or shoulders. In contrast, there are still some impurity phases associated with BaCO$_3$ and BaZrO$_3$ in samples (b) and (c). It is also found that the BaZrO$_3$ phase in sample (c) remained even after being fired at higher temperatures.

Consequently, FIGS. 1 and 2 show that the BZCYYb prepared by the method of the present invention has significantly better purity than the BZCYYb prepared by conventional methods. The ionic conductivity of the single phase BZCYYb is measured next.

Comparison of Conductivity

Figure 3:
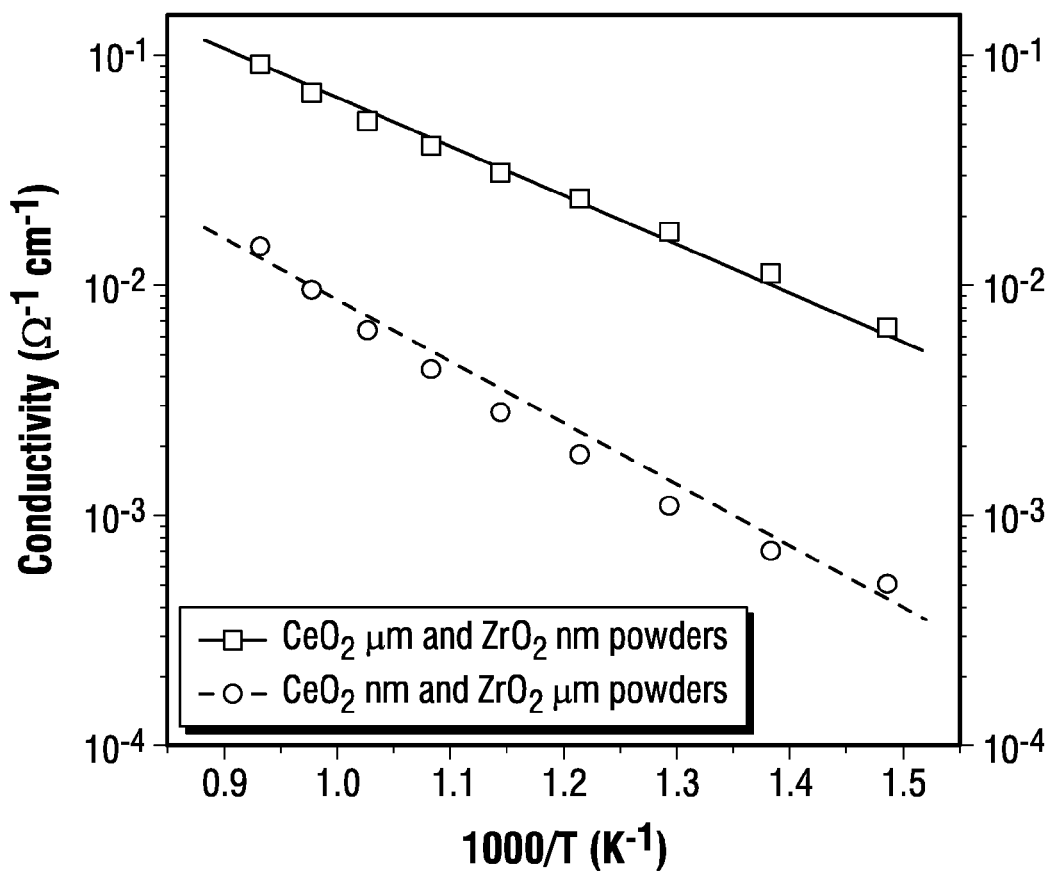
FIG. 3 shows the ionic conductivity of BZCYYb fabricated from $CeO_2$ and $ZrO_2$ powders of different ranges of diameter.

FIG. 3 shows the electrical conductivity of BaZr$_{0.1}$Ce$_{0.7}$Y$_{0.1}$Yb$_{0.1}$O$_3$ samples (sintered pellets) measured at 500-800° C. in air. The values of conductivity are also shown in the Table 3.

It is easily seen that BZCYYb pellet with micron-sized CeO$_2$ and nano-sized ZrO$_2$ precursors (Sample a) displayed much higher conductivity, reaching 9.19×10$^{-2}$ Ω$^{-1}$cm$^{-1}$ at 800° C.

It is therefore concluded that nano-sized ZrO$_2$ and micron-sized CeO$_2$ precursors effectively facilitated formation of pure perovskite phase and eliminated the segregation of the BaZrO$_3$ phase, thereby enhancing the overall electrical conductivity.

TABLE 3

Ionic conductivity data of BZCYYb fabricated from (a) CeO$_2$ μm and ZrO$_2$ nm powders, (b) CeO$_2$ nm and ZrO$_2$ μm powders.

| Temperature | Ionic conductivity (Ω$^{-1}$ cm$^{-1}$) | |
|---|---|---|
| (° C.) | (a) | (b) |
| 400 | 0.0065 | 0.0005 |
| 450 | 0.0112 | 0.0007 |
| 500 | 0.0169 | 0.0011 |
| 550 | 0.0235 | 0.0018 |
| 600 | 0.0308 | 0.0028 |
| 650 | 0.0403 | 0.0043 |
| 700 | 0.0513 | 0.0064 |
| 750 | 0.0682 | 0.0096 |
| 800 | 0.0919 | 0.0147 |

Using the Electrolyte in Tubular SOFC

Both cell architecture and electrode microstructure greatly influence the performance and reliability of SOFC systems. The tubular SOFC configuration shows advantages over planar SOFC systems, including higher mechanical integrity, better thermal-cycling behavior, and simpler gas manifolding and sealing.

Although tubular SOFCs have been extensively reported in the literature, little attention has been paid to the proton and oxide ion mixed conducting electrolyte for intermediate temperature SOFC (IT-SOFC) applications. In this discussion, the progress of our high performance tubular SOFCs, based on our well-developed BaZr$_{0.1}$Ce$_{0.7}$Y$_{0.1}$Yb$_{0.1}$O$_{3-\delta}$ (BZCYYb) [6] system, is reported.

The tubular SOFCs with a Ni-BZCYYb|BZCYYb|LSCF-BZCYYb configuration were fabricated as follows:

First, the BZCYYb powder prepared as described in Sample A, with nano-sized ZrO$_2$ and micro-sized CeO$_2$ as precursors, was synthesized by a solid-state reaction. Then, powders of NiO (ALFA™, USA), BZCYYb, and graphite were mixed in a weight ratio of 65:35:10 with ethanol by ball milling for 24 hours. After drying, the mixture was then mixed with triethanolamine (ALFA™, USA), dibutyl phthalate (ALFA™, USA), polyethylene glycol (RICHARD E. MISTLER™, INC., USA), and polyviyl butyral (RICHARD E. MISTLER™, INC, USA), and ball-milled for 24 hours to obtain a uniform and stable ceramic slurry.

This slurry was then transferred to a vessel and degassed at room temperature under a ~$1\times10^{-1}$ bar vacuum for 10 minutes. A glass rod was then dipped into the ceramic slurry and, after a few seconds, it was lifted out. The layer of the NiOBZCYYb slurry left on the glass rod was dried in air. This dip-coating process was repeated several times to obtain the desired thickness of the tubular anode support. After drying in air, the tubular anode was easily removed from the rod.

Second, a thin layer of BZCYYb (~12 μm) electrolyte, powder prepared as described in Sample A (with nano-sized $ZrO_2$ and micro-sized $CeO_2$ as precursors), was deposited on the anode support by a similar dip-coating process followed by co-firing at 1400° C. for 5 hours.

Third, a LSCF-BZCYYb slurry was made using the powder BZCYYb prepared as described in Sample A (with nano-sized $ZrO_2$ and micro-sized $CeO_2$ as precursors) and the slurry was then brush painted onto the BZCYYb electrolyte and fired at 1000° C. for 2 hours to form a porous cathode (~15 μm).

The resulting anode-supported tubular SOFCs had a typical length of ~2.0 cm, an outside/inside diameter of ~5.0 mm/4.5 mm, and an effective cathode area of ~1.0 $cm^2$.

The microstructure of the anode-supported tubular SOFCs was revealed using a scanning electron microscope (SEM, LEO 1530) equipped with energy dispersive x-ray spectroscopy (EDS). The single tubular SOFCs were sealed on ceramic support tubes with silver paste. Hydrogen at a flow rate of 30 sccm (standard cubic centimeters per minute) and ambient air were used as fuel and oxidant, respectively. The I-V curves and power outputs of the test cells were monitored using an ARBIN™ fuel cell testing system (MSTAT). Impedance spectra were acquired using a SOLARTRON™ 1255 HF frequency response analyzer, interfaced with an EG&G™ PAR potentiostat model 273A. The frequency of the impedance measurement ranged from 100 kHz to 0.01 Hz and the AC amplitude was 5 mV.

Figure 4A:
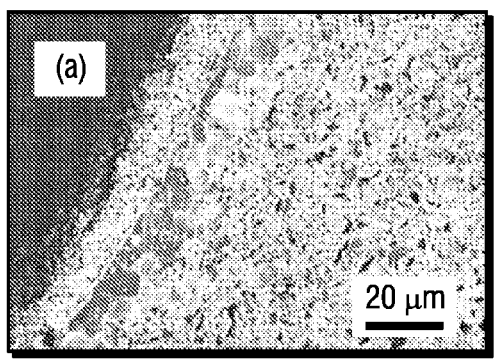
FIG. 4 shows the cross-sectional SEM images of (a) anode-supported tubular SOFCs; (b) the electrolyte/electrode interface; (c) the electrolyte layer; (d) the anode layer.

FIG. 4(a) shows the overall microstructure of an anode-supported tubular SOFC with ~200 μm anode, ~12 μm electrolyte, and ~15 μm cathode.

Figure 4B:
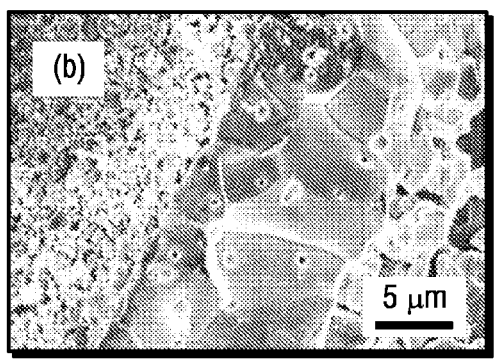

FIG. 4(b) shows that the electrolyte and the electrode layers are well adhered. The interfaces show no observable delamination or cracks. The porous anode layer, close to the electrolyte, with small sponge-like pores, is considered to be the functional layer of the anode where the electrochemical reactions take place. Furthermore, the small sponge-like pores adjacent to the electrolyte layer allow the BZCYYb particles to penetrate into the Ni-BZCYYb functional layer when the BZCYYb electrolyte film is prepared by the dip-coating process. It is expected that optimization of the anode-electrolyte interface microstructure will decrease the anode polarization by increasing the triple phase boundary (TPB) lengths.

Figure 4C:
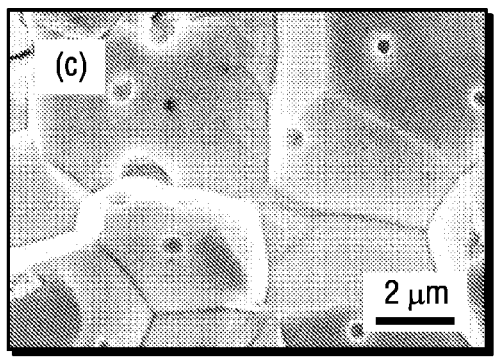

FIG. 4(c) shows that the electrolyte layer is very dense, without any open cracks or pinholes. The co-firing process produced a uniform, homogeneous, and dense BZCYYb electrolyte with a thickness of ~12 μm.

Figure 4D:
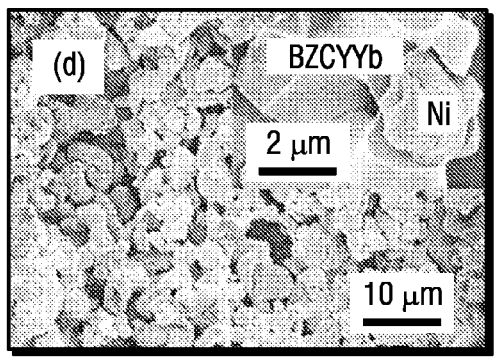

FIG. 4(d) shows that the anodes have uniform sponge-like porous microstructures with typical pore sizes in the range of a few microns, and the tubes are free of cracks or other visible defects. The uniform microstructure in our anode appreciably increases the grain connection and gas transport while maintaining adequate mechanical strength. Therefore, the anode layer is a good porous support and is beneficial for gas permeation.

Figure 5:
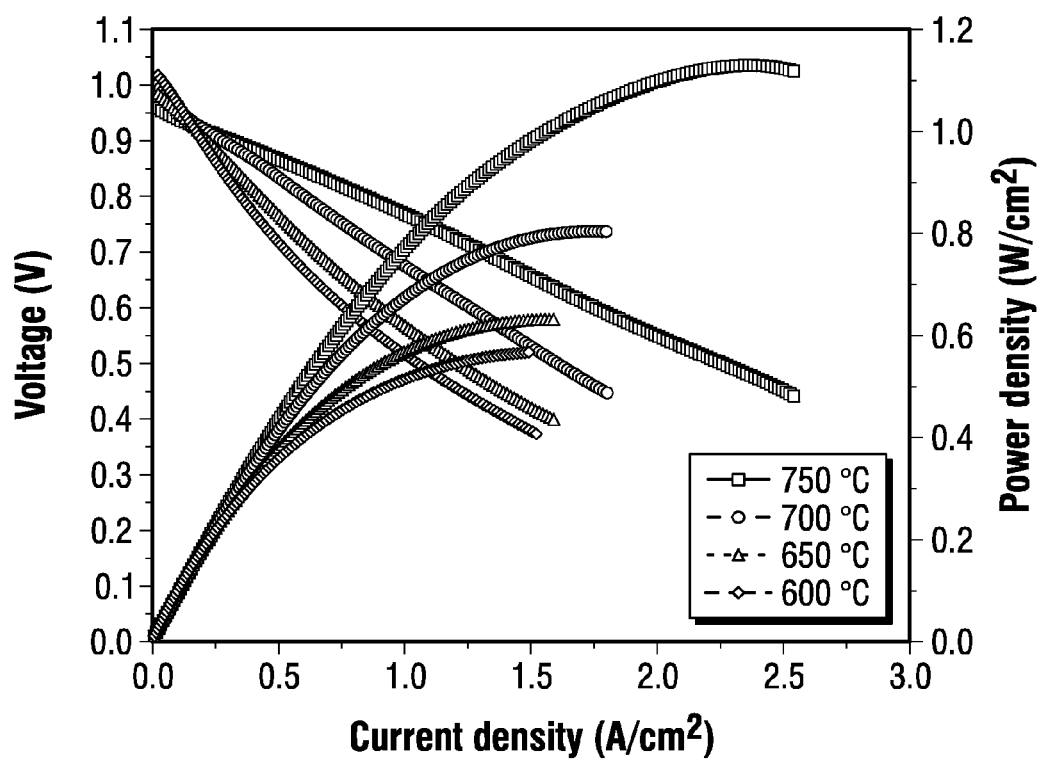
FIG. 5 shows the current-voltage characteristics and the corresponding power densities for tubular SOFCs measured at 600-750° C. when ambient air was used as oxidant and hydrogen as fuel, in which the electrolyte of the tubular SOFCs is the BZCYYb prepared by the present invention.

FIG. 5 shows the typical performance of a single cell tested at 600-750° C. It yielded peak power densities of 0.57, 0.63, 0.81, and 1.13 W $cm^{-2}$ at 600, 650, 700, and 750° C., respectively, when hydrogen was used as fuel and ambient air as oxidant. The open circuit voltage (OCV) varied from 1.04 to 0.98 V as the temperature was increased from 600 to 750° C.

This OCV is close to the theoretical value calculated from the Nernst equation. The high OCV values indicate that the gas leakage through the electrolyte was negligible and the prepared electrolyte is very dense without any cracks or defects. To the best of our knowledge, these power densities are the highest ever reported for tubular SOFCs based on a BZCYYb electrolyte. The power densities at intermediate temperatures, i.e. 0.57 W $cm^{-2}$ achieved at 600° C., are especially exceptional and are more than twice as high as those reported for similar cells produced by phase-inversion method [6].

The high performance at intermediate temperatures in this work is attributed primarily to the significant reduction of the ohmic resistance of the tubular cells. A similar behavior has been reported by Suzuki et al. for tubular fuel cells with Ni-YSZ anodes [7]. The performance may be further enhanced by other modifications, such as catalyst infiltration [8].

The following references are incorporated by reference in their entirety.
1. Lewis, N. S. and Nocera, D. G., (2006), "Powering the planet: Chemical challenges in solar energy utilization." *Proceedings of the National Academy of Sciences of the United States of America*, Vol. 103, pp. 15729-15735.
2. Singhal, S. C., (2000), "Advances in solid oxide fuel cell technology." *Solid State Ionics*, Vol. 135, pp. 305-313.
3. Atkinson, A., Barnett, S., Gorte, R. J., Irvine, J. T. S., McEvoy, A. J., Mogensen, M., Singhal, S. C. and Vohs, J., (2004), "Advanced anodes for high-temperature fuel cells." *Nature Materials*, Vol. 3, pp. 17-27.
4. Goodenough, J. B., (2003), "Oxide-ion electrolytes." *Annual Review of Materials Research*, Vol. 33, pp. 91-128.
5. Fleig, J., (2003), "Solid oxide fuel cell cathodes: Polarization mechanisms and modeling of the electrochemical performance." *Annual Review of Materials Research*, Vol. 33, pp. 361-382.
6. Chen, Y. F. and J. W. Evans, Cool-down time of solid oxide fuel cells intended for transportation application. Journal Of Power Sources, 1996. 58(1): p. 87-91.
7. Kniep, J. and Y. S. Lin, *Effect of Zirconium Doping on Hydrogen Permeation through Strontium Cerate Membranes*. Industrial & Engineering Chemistry Research, 2010. 49(6): p. 2768-2774.
8. US20100112408
9. U.S. Pat. No. 7,595,127

What is claimed is:

1. A method for preparing a homologous phase BZCYYb, comprising the steps of:
   a) obtaining at least ingredients in i), ii), iii), iv) and v) in stoichiometric amounts:
      i) barium carbonate powder having an average particle diameter in about 1 nanometer to about 1000 nanometer range,
      ii) zirconium oxide powder having an average particle diameter in about 1 nanometer to about 1000 nanometer range, iii) cerium oxide powder having an average particle diameter in about 1 micrometer to about 1000 micrometer range, iv) ytterbium oxide powder having an average particle diameter in about 100 nanometer to about 200 nanometer range, and v) yttrium oxide powder;

b) mixing the ingredients from step a);

c) calcining a resulting mixture; and d) optionally repeating steps b) and c) to obtain the homologous phase BZCYYb.

2. The method of claim 1, wherein step a) further comprises mixing stoichiometric amounts of NiO or LSCF to the mixture.

3. The method of claim 1, wherein the mixing is done in ethanol.

4. The method of claim 1, wherein the mixing step is carried out by ball milling in ethanol.

5. The method of claim 1, wherein the calcining step is carried out at approximately 1100° C. in air for approximately 10 hours.

6. The method of claim 1, wherein the average particle diameter of the zirconium oxide powder is in about 50 nanometer to about 200 nanometer range.

7. The method of claim 1, wherein the average particle diameter of the cerium oxide powder is in about 1 micrometer to about 20 micrometer range.

8. The method of claim 1, wherein the yttrium oxide powder has an average particle diameter in about 100 nanometer to about 200 nanometer range.

9. An improved method of making a BZCYYb material by mixing and calcining ingredients thereof, wherein the improved method comprises using about 200 nanometer sized barium carbonate powder, about 50 nanometer to about 100 nanometer sized zirconium oxide powder and about 5 micrometer sized cerium oxide powder as starting ingredients.

* * * * *

UNITED STATES PATENT AND TRADEMARK OFFICE
CERTIFICATE OF CORRECTION

PATENT NO.        : 8,993,200 B2
APPLICATION NO.   : 13/610126
DATED             : March 31, 2015
INVENTOR(S)       : Mingfei Liu et al.

Page 1 of 1

It is certified that error appears in the above-identified patent and that said Letters Patent is hereby corrected as shown below:

On The Title Page, item 75, the inventor name "MingFei Liu" should read --Mingfei Liu--.

Signed and Sealed this
Seventh Day of July, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,993,200 B2 | Page 1 of 1 |
| APPLICATION NO. | : 13/610126 | |
| DATED | : March 31, 2015 | |
| INVENTOR(S) | : Mingfei Liu et al. | |

It is certified that error appears in the above-identified patent and that said Letters Patent is hereby corrected as shown below:

On the Title Page, item (54) the term "BZCYYB" should read --BZCYYb--.

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,993,200 B2 | Page 1 of 1 |
| APPLICATION NO. | : 13/610126 | |
| DATED | : March 31, 2015 | |
| INVENTOR(S) | : Mingfei Liu et al. | |

It is certified that error appears in the above-identified patent and that said Letters Patent is hereby corrected as shown below:

On The Title Page

Item (54) Title: The term "BZCYYB" should read --BZCYYb--.

Item (75) Inventors: The inventor name "MingFei Liu" should read --Mingfei Liu--.

This certificate supersedes the Certificate of Correction issued August 25, 2015.

Signed and Sealed this
Seventeenth Day of November, 2015

Michelle K. Lee
*Director of the United States Patent and Trademark Office*